UNITED STATES PATENT OFFICE.

OTTO FISCHER, OF MUNICH, BAVARIA, GERMANY.

METHOD OF PREPARING OXYQUINOLINE.

SPECIFICATION forming part of Letters Patent No. 270,045, dated January 2, 1883.

Application filed May 27, 1882. (No specimens.)

*To all whom it may concern:*

Be it known that I, Dr. OTTO FISCHER, of Munich, Bavaria, have invented a new and useful Improvement in the Method of Preparing Oxyquinoline, of which the following is a specification.

This invention relates to certain new and useful improvements in the manufacture of a new antiseptic, which is known as "oxyquinoline," produced from quinoline-sulphonic acid.

In 1869 the discovery was made that quinoline-sulphonic acid is produced when cinchonia quinoline is treated with concentrated sulphuric acid. Quinoline-sulphonic acid can also be produced by the action of concentrated sulphuric acid on the quinoline of coal-tar and the artificial quinoline prepared by Skraup.

My invention consists in converting the quinoline-sulphonic acid into oxyquinoline by heating the quinoline-sulphonic acid with caustic potash or soda.

In carrying out my invention one part, by weight, of quinoline-sulphonic acid is carefully heated in an iron melting-pan on an open fire with from one to two parts, by weight, of caustic soda or two or three parts, by weight, of caustic potash. The heating is continued until a sample of the molten mass on being neutralized with hydrochloric acid no longer gives a separation of unchanged quinoline-sulphonic acid. When this point has been reached the molten mass is dissolved in water and completely neutralized by hydrochloric acid. The oxyquinoline is then distilled off by a strong current of steam. The oxyquinoline thus obtained and its salts are new antiseptics, and are capable of taking the place of salicylic acid in many cases.

For technical purposes a solution of the above oxyquinoline in water or in diluted acids is employed.

Having thus fully described my invention, I claim as new and desire to secure by Letters Patent—

The method of preparing oxyquinoline by treating quinoline-sulphonic acid with caustic soda or potash under the action of heat, substantially as herein set forth.

In testimony whereof I have signed my name to this specification in the presence of two subscribing witnesses.

OTTO FISCHER.

Witnesses:
    Dr. EMIL BOSTHORN,
    EMIL HENZEL.